United States Patent
Yamaguchi

(10) Patent No.: US 9,041,781 B2
(45) Date of Patent: May 26, 2015

(54) IMAGE PROCESSING APPARATUS, IMAGE PROCESSING METHOD, AND PROGRAM

(75) Inventor: Hiroshi Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 481 days.

(21) Appl. No.: 13/435,177

(22) Filed: Mar. 30, 2012

(65) Prior Publication Data

US 2012/0256912 A1 Oct. 11, 2012

(30) Foreign Application Priority Data

Apr. 8, 2011 (JP) ................. 2011-085994

(51) Int. Cl.
*G06T 15/00* (2011.01)
*H04N 13/04* (2006.01)
*H04N 13/00* (2006.01)

(52) U.S. Cl.
CPC ....... *H04N 13/0497* (2013.01); *H04N 13/0022* (2013.01)

(58) Field of Classification Search
CPC .......... H04N 13/0003; H04N 13/0033; H04N 13/0409
See application file for complete search history.

(56) References Cited

FOREIGN PATENT DOCUMENTS

| CN | 101964918 A | 2/2011 |
|---|---|---|
| JP | H08-019003 A | 1/1996 |
| JP | 2004-7395 | 1/2004 |
| JP | 2005-073013 A | 3/2005 |
| JP | 2011-024151 A | 2/2011 |
| JP | 2012-065066 A | 3/2012 |

OTHER PUBLICATIONS

Japanese Office Action issued on Jan. 13, 2015 in Japanese application No. 2011-085994.

Chinese Office Action issued on Feb. 10, 2015 in Chinese application No. 201210094555.8.

*Primary Examiner* — Huy T Nguyen

(74) *Attorney, Agent, or Firm* — Sony Corporation

(57) ABSTRACT

An image processing apparatus includes a stereoscopic effect adjustment unit that receives left eye images and right eye images applied to three-dimensional image display, and performs stereoscopic effect adjustment by correcting the received images which are input images, wherein the stereoscopic effect adjustment unit performs a reduction process or an enlargement process in a transverse direction for at least any ones of the left eye images and the right eye images, and generates corrected images where parallax is adjusted.

8 Claims, 13 Drawing Sheets

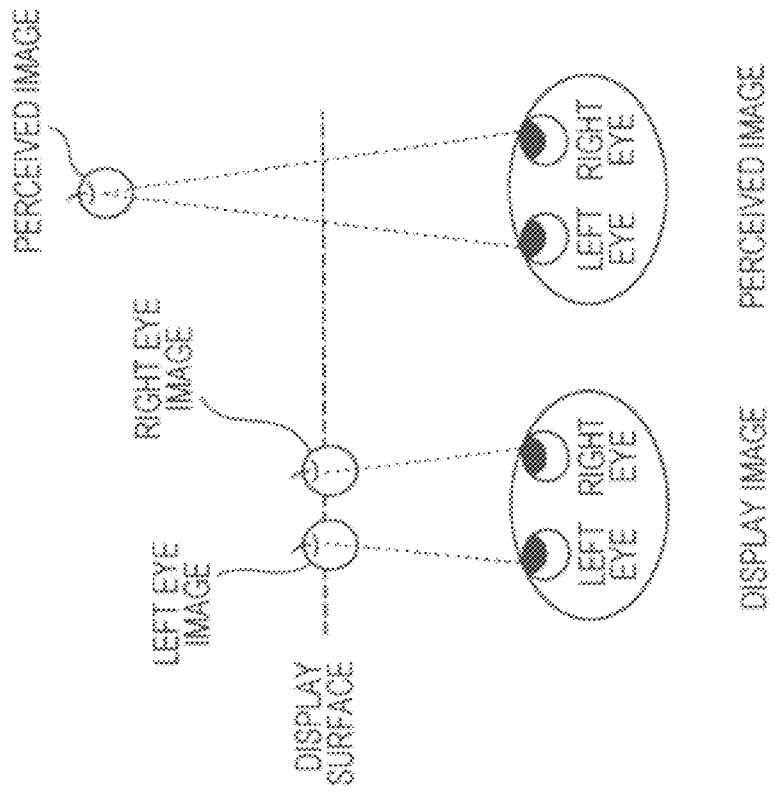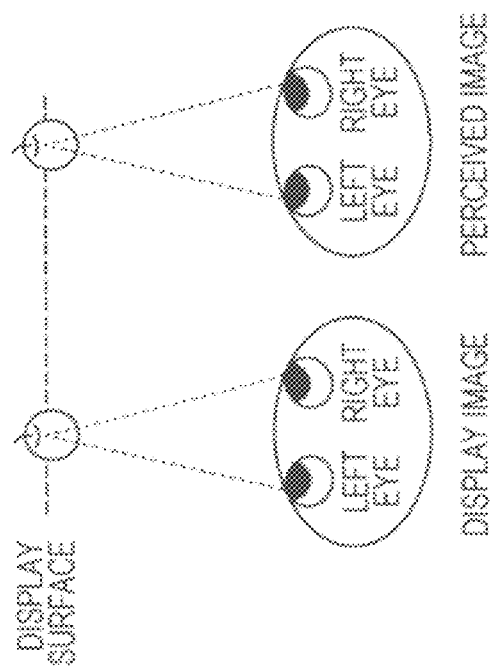

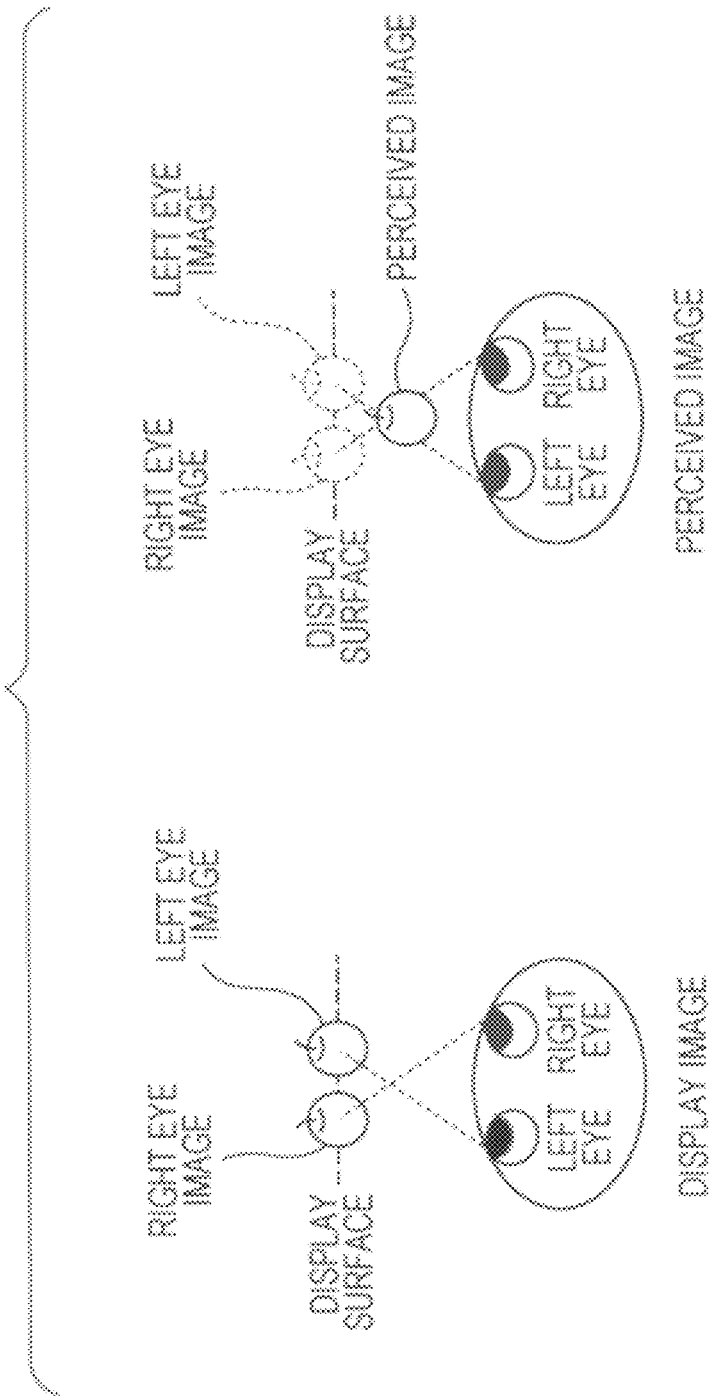

FIG. 10
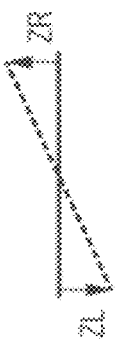
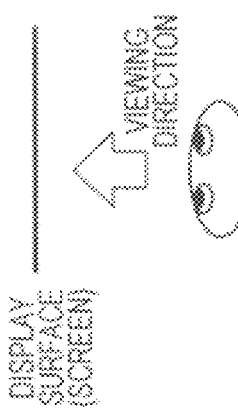

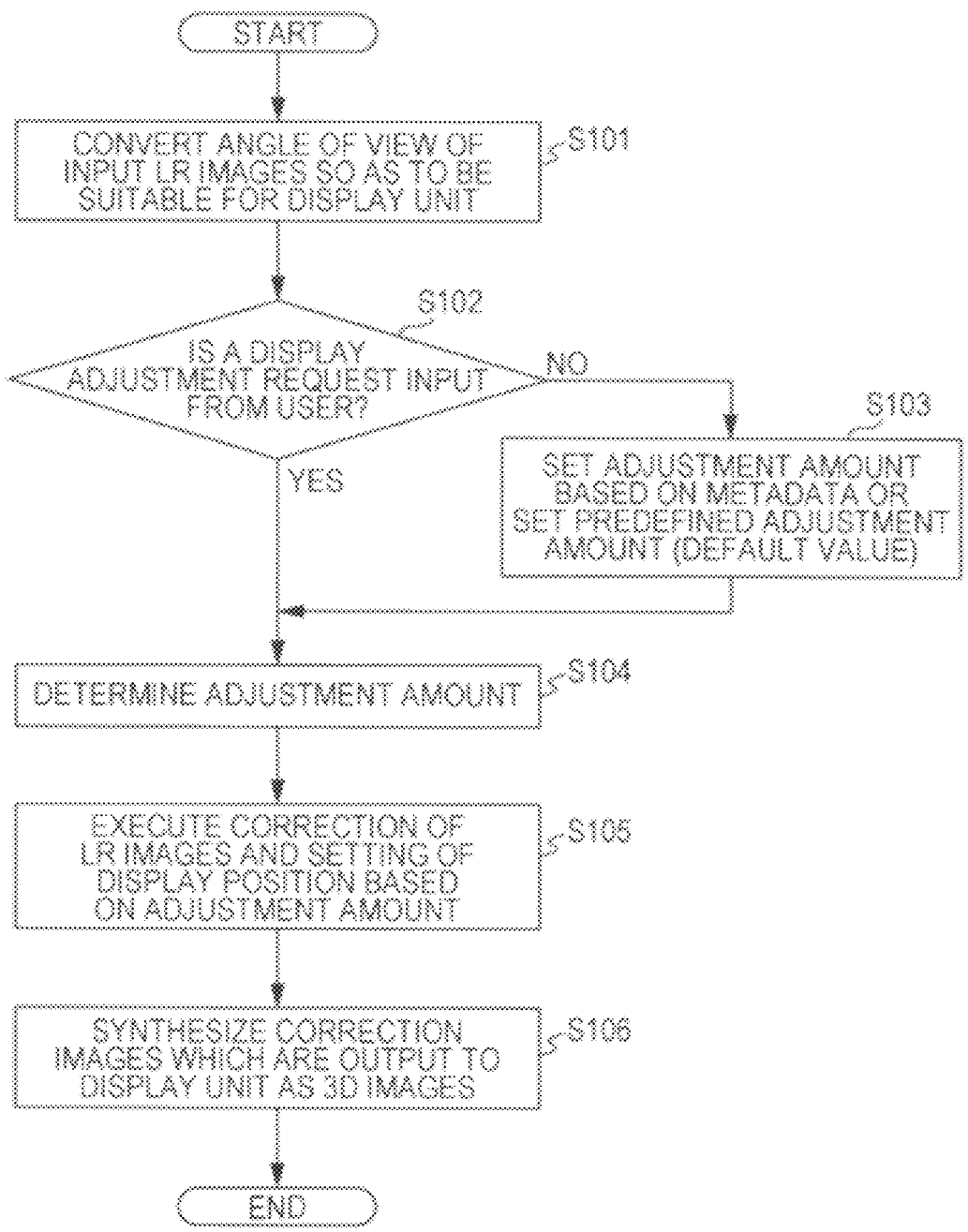

IMAGE PROCESSING APPARATUS, IMAGE PROCESSING METHOD, AND PROGRAM

BACKGROUND

The present disclosure relates to an image processing apparatus, an image processing method, and a program. Particularly, the present disclosure relates to an image processing apparatus, an image processing method, and a program, which perform three-dimensional image display.

In recent years, display devices such as a television set or a PC which can display three-dimensional images (3D images) called stereoscopic images, or video cameras or still cameras which can record three-dimensional images (3D images) have been developed and used. It is necessary to capture two images from different viewpoints in order to display 3D images. That is to say, the two images are a left eye image from a left eye viewpoint and a right eye image from a right eye viewpoint.

When the two images captured from different viewpoints are displayed, a control is performed such that the left eye image is viewed only with the left eye of a viewer, and the right eye image is viewed only with the right eye of the viewer, and thereby the viewer can perceive a stereoscopic effect. In addition, methods of recording, transmitting, and displaying 3D images include various methods.

As one of methods of displaying 3D images, there is a method in which, for example, a left eye image and a right eye image are alternately displayed on a display device; a viewer wears shutter type glasses; a shutter conversion is performed for each of the left eye image display period and the right eye image display period; and each image is viewed only with one eye.

For example, in a case of displaying the 3D images, the left eye image and the right eye image are displayed such that display positions of the same display object deviate in the left and right directions. By displaying the images with such parallax, a viewer can perceive stereoscopic images with a sense of depth. An example of setting parallax will be described with reference to FIGS. 1A to 2.

FIG. 1A shows a display image and a perceived image of an image where parallax is absent, FIG. 1B shows a display image and a perceived image of an image where parallax is present, and the two figures are arranged in parallel to each other.

In FIG. 1A, in a case of the display image of the image where parallax is absent, display positions of an object (apple) on an image display surface are the same in both the left eye image and the right eye image.

In this case, as shown in FIG. 1A, the display object (apple) is viewed exactly at the same position on the display surface in both the left eye image viewed with the left eye of a viewer and the right eye image viewed with the right eye of the viewer.

As a result, the viewer perceives the display object (apple) so as to be located at the display surface position.

On the other hand, as shown in the display image of FIG. 1B, a case where parallax is present in FIG. 1B (a parallax setting example 1) shows a parallax setting example where the left eye image displayed on the display surface is deviated to the left (the left when viewed from the viewer) and the right eye image is deviated to the right (the right when viewed from the viewer).

In this setting, as shown in the perceived image of FIG. 1B, the viewer perceives the object corresponding to the images further on the inner side (distant place) than the display surface.

In addition, as shown in the display image of FIG. 2, a case where parallax is present in FIG. 2 (a parallax setting example 2) shows a parallax setting example where the left eye image displayed on the display surface is deviated to the right (the right when viewed from the viewer) and the right eye image is deviated to the left (the left when viewed from the viewer). In this setting, as shown in the perceived image of FIG. 2, the viewer perceives the object corresponding to the images further on the front side (near place) than the display surface.

As such, the viewer can perceive positions of the display object at various positions through parallax setting in the left eye image and the right eye image.

However, there are cases where if images where parallax is present are displayed, some viewers experience discomfort or eye fatigue. In order to solve the problem, there has been proposed a configuration capable of adjusting parallax. For example, Japanese Patent No. 3749227 discloses a configuration where parallax is adjusted by the entire screen deviating uniformly. However, if the images are entirely moved, there is a problem in that an end part of an image to be originally displayed on the display unit is omitted.

SUMMARY

It is desirable to provide an image processing apparatus, an image processing method, and a program, which realize parallax adjustment without the overall images deviating.

In addition, it is desirable to provide an image processing apparatus, an image processing method, and a program, which can perform parallax adjustment where image omission is reduced or there is no image omission.

According to an embodiment of the present disclosure, there is provided an image processing apparatus including a stereoscopic effect adjustment unit that receives left eye images and right eye images applied to three-dimensional image display, and performs stereoscopic effect adjustment by correcting the received images which are input images, wherein the stereoscopic effect adjustment unit performs a reduction process or an enlargement process in a transverse direction for at least any ones of the left eye images and the right eye images, and generates corrected images where parallax is adjusted.

The stereoscopic effect adjustment unit may determine display positions of the corrected images generated by reducing or enlarging at least any ones of the left eye images and the right eye images in the transverse direction, on a display unit.

The image processing apparatus may further include an input unit to which image setting information can be input; and a stereoscopic effect adjustment amount determination unit that determines control parameters for determining image correction types according to the image setting information input from the input unit. Here, the stereoscopic effect adjustment unit may perform an image correction process and a display position determination process according to the control parameters determined by the stereoscopic effect adjustment amount determination unit.

The image setting information input from the input unit may be left and right end portion depth information ZL and ZR of display images, and, in this case, the stereoscopic effect adjustment amount determination unit may determine enlargement or reduction ratios of the left eye image and the right eye image and display positions thereof on the display unit, based on the depth information ZL and ZR.

In addition, the stereoscopic effect adjustment amount determination unit may determine enlargement or reduction ratios of the left eye image and the right eye image and display positions thereof on the display unit, based on metadata attached to the input images.

The image processing apparatus may further include a display unit that performs 3D image display to which a left eye image and a right eye image which are the corrected images generated by the stereoscopic effect adjustment unit are applied.

According to another embodiment of the present disclosure, there is provided an image processing method executed in an image processing apparatus, including causing a stereoscopic effect adjustment unit to receive left eye images and right eye images applied to three-dimensional image display, and to perform stereoscopic effect adjustment by correcting the received images which are input images, wherein the adjusting of the stereoscopic effect includes performing a reduction process or an enlargement process in a transverse direction for at least any ones of the left eye images and the right eye images, and generating corrected images where parallax is adjusted.

According to still another embodiment of the present disclosure, there is provided a program enabling an image processing apparatus to execute an image process including causing a stereoscopic effect adjustment unit to receive left eye images and right eye images applied to three-dimensional image display, and to perform stereoscopic effect adjustment by correcting the received images which are input images, wherein the adjusting of the stereoscopic effect includes performing a reduction process or an enlargement process in a transverse direction for at least any ones of the left eye images and the right eye images, and generating corrected images where parallax is adjusted.

In addition, the program according to still another embodiment of the present disclosure is, for example, a program which can be provided by a storage medium or a communication medium which is provided in a computer readable format to an information processing apparatus or a computer system capable of executing various programs or codes. Such a program is provided in a computer readable format, and thereby processes corresponding to the program are realized on the information processing apparatus or the computer system.

Other objects, features, or advantages of the present disclosure will be shown through more detailed description based on embodiments of the present disclosure described below or the accompanying drawings. In addition, in the present specification, a system is a logical set of a plurality of constituent devices and is not limited to the respective constituent devices being in the same casing.

According to the configuration according to the embodiment of the present disclosure, it is possible to provide an apparatus and a method capable of adjusting a stereoscopic effect through a simple process.

Specifically, there is provided a stereoscopic effect adjustment unit that receives left eye images and right eye images applied to three-dimensional image display, and performs stereoscopic effect adjustment by correcting the received images which are input images. The stereoscopic effect adjustment unit performs a reduction process or an enlargement process in a transverse direction for at least any ones of the left eye images and the right eye images, for example, according to setting information input from a user, and generates corrected images where parallax is adjusted. In addition, the stereoscopic effect adjustment unit determines display positions of the corrected images on a display unit, and outputs the determined display positions to the display unit so as to perform a 3D image display process.

In the present configuration, for example, parallax can be adjusted only with the reduction process for images, and thus it is possible to perform a control for displaying display objects at any depth position.

BRIEF DESCRIPTION OF THE DRAWINGS

FIGS. 1A and 1B are diagrams illustrating examples of parallax setting and images perceived by a viewer.

FIG. 2 is a diagram illustrating examples of parallax setting and images perceived by a viewer.

FIG. 10 is a diagram illustrating an example of the process performed by an image processing apparatus according to the embodiment of the present disclosure.

FIG. 13 is a flowchart illustrating a sequence of processes executed by the image processing apparatus according to the embodiment of the present disclosure.

DETAILED DESCRIPTION OF EMBODIMENTS

Figure 3A:
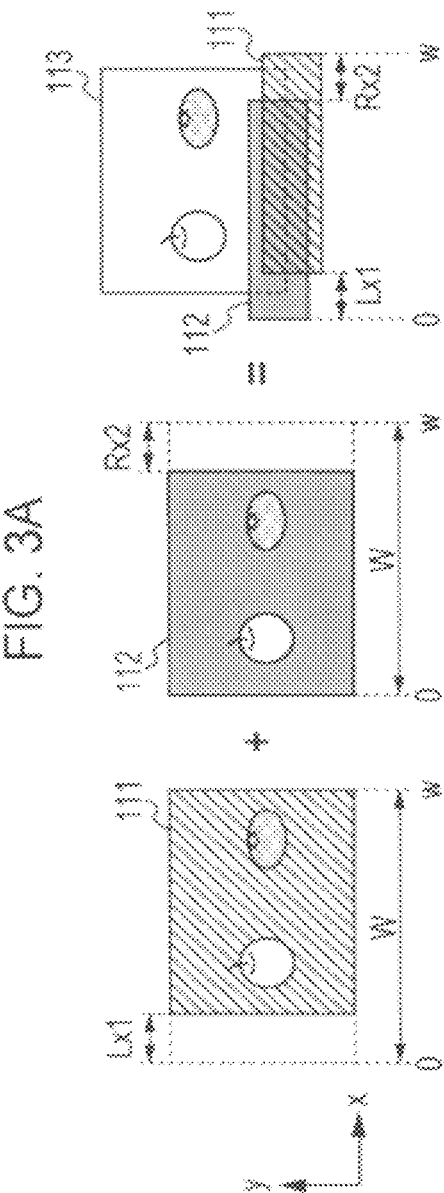
FIGS. 3A and 3B are diagrams illustrating an example of the process performed by an image processing apparatus according to an embodiment of the present disclosure.

Hereinafter, an image processing apparatus, an image processing method, and a program according to embodiments of the present disclosure will be described with reference to the accompanying drawings. The description will be made in the following order.

1. PROCESSES EXECUTED BY IMAGE PROCESSING APPARATUS ACCORDING TO EMBODIMENT OF PRESENT DISCLOSURE 1-1. PROCESS EXAMPLE 1: Display Process Example Where Display Object Is Perceived Further on Front Side than Display Surface 1-2. PROCESS EXAMPLE 2: Display Process Example Where Display Object Is Perceived Further on Inner Side than Display Surface 1-3. PROCESS EXAMPLE 3: Display Process Example Where Left Display Object Is Perceived Further on Front Side and Right Display Object Is Perceived Further on Inner Side than Display Surface 1-4. PROCESS EXAMPLE 4: Display Process Example Where Left Display Object Is Perceived Further on Inner Side And Right Display Object Is Perceived Further on Front Side than Display Surface

2. CONFIGURATION OF AND PROCESSES IN IMAGE PROCESSING APPARATUS

3. PROCESS SEQUENCE EXECUTED BY IMAGE PROCESSING APPARATUS

4. CONCLUSION OF CONFIGURATION ACCORDING TO PRESENT DISCLOSURE

1. PROCESSES EXECUTED BY IMAGE PROCESSING APPARATUS ACCORDING TO EMBODIMENT OF PRESENT DISCLOSURE

First, detailed examples of the processes executed by the imaging apparatus according to an embodiment of the present disclosure will be described with reference to FIGS. 3A and 3B and thereafter.

In the imaging apparatus of the embodiment of the present disclosure, a left eye image (L image) and a right eye image (R image) for 3D image display which are generated in advance are input, and, for example, an image correction process is performed for the LR images, thereby generating a left eye image (L image) and a right eye image (R image) where parallax is adjusted. The generated images are output to, for example, a display device, and are displayed as 3D images.

Detailed process examples will be described with reference to FIGS. 3A and 3B and thereafter. The following four detailed process examples will be described sequentially.

1-1. PROCESS EXAMPLE 1: Display Process Example Where Display Object Is Perceived Further on Front Side than Display Surface 1-2. PROCESS EXAMPLE 2: Display Process Example Where Display Object Is Perceived Further on Inner Side than Display Surface 1-3. PROCESS EXAMPLE 3: Display Process Example Where Left Display Object Is Perceived Further on Front Side and Right Display Object Is Perceived Further on Inner Side than Display Surface 1-4. PROCESS EXAMPLE 4: Display Process Example Where Left Display Object Is Perceived Further on Inner Side and Right Display Object Is Perceived Further on Front Side than Display Surface

1-1. PROCESS EXAMPLE 1

Display Process Example Where Display Object is Perceived Further on Front Side than Display Surface First, as a process example 1, a display process example where a display object is perceived further on the front side than the display surface will be described with reference to FIGS. 3A and 3B.

Figure 3B:
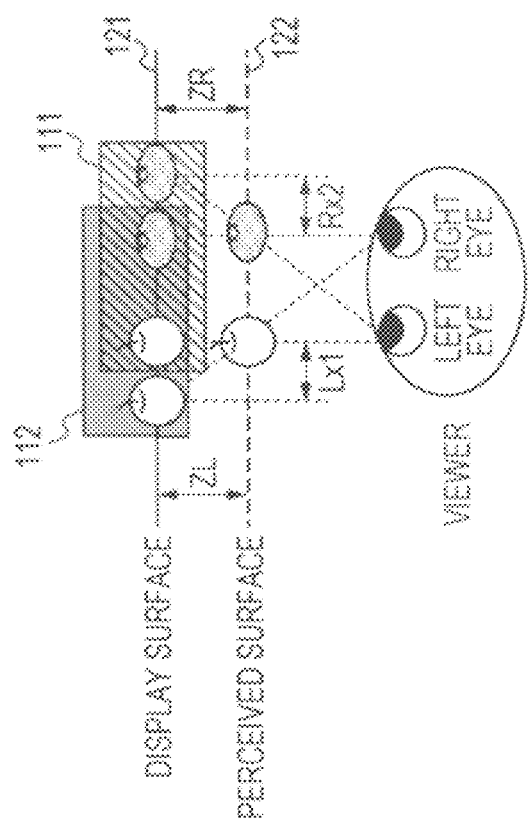

FIGS. 3A shows a display image generation example 1, and FIG. 3B shows a display image perception example 1 (all protrude forward).

The display image generation example 1 of FIG. 3A shows a detailed example of the image process executed by the image processing apparatus according to the embodiment of the present disclosure.

In the image processing apparatus according to the embodiment of the present disclosure, a left eye image (L image) and a right eye image (R image) for 3D image display which are generated in advance are input; an image reduction process is performed for at least one of the LR images so as to generate corrected LR images; and, display positions of the corrected LR generated are determined.

The left eye image (L image) and the right eye image (R image) for 3D image display, input to the image processing apparatus are images captured from different viewpoints, and are images to which parallax according to a subject distance is set as described with reference to FIGS. 1A to 2.

When such images are displayed on a display unit as they are, a stereoscopic effect (sense of depth) according to the parallax can be perceived.

The image processing apparatus receives LR images for 3D image display, captured from different viewpoints, such as, for example, LR images captured by a 3D image capturing camera or 3D broadcasting LR images received from a broadcasting station, and the image processing apparatus reprocesses the LR images so as to generate corrected LR images for output to the display unit.

The image processing apparatus according to the embodiment of the present disclosure described below executes an image reduction process in the horizontal direction (left and right directions) for at least one image of the input LR images, thereby realizing parallax adjustment.

The example shown in FIG. 3A shows a process example where both of a left eye image (L image) and a right eye image (R image) which are input images are reduced in the horizontal direction, thereby generating a left eye correction image 111 and a right eye correction image 112.

The left eye correction image 111 and the right eye correction image 112 are output to a display device which can display 3D images as a 3D display image 113.

For example, the reduced left eye correction image 111 and the reduced right eye correction image 112 are alternately output, setting is performed such that a viewer wearing shutter-type glasses views the left eye correction image 111 only with the left eye and views the right eye correction image 112 only with the right eye, and thereby 3D images can be viewed.

The image correction process shown in FIG. 3A will be described in detail.

A width of original input LR images input to the image processing apparatus is denoted by W.

The image processing apparatus reduces the horizontal width of the input L image by $L \times 1$, and thus performs a reduction process where the image width of the L image in the horizontal direction is reduced from W to $(W-L \times 1)$.

In other words, if a reduction ratio of the L image in the horizontal direction is Lm, $Lm=(W-L \times 1)/W$.

The image reduction process in the image horizontal direction is performed at the set reduction ratio, thereby generating the left eye correction image 111.

In addition, the image processing apparatus reduces a horizontal width of the R image by $R \times 2$, and thus performs a reduction process where the image width of the R image in the horizontal direction is reduced from W to $(W-R \times 2)$.

In other words, if a reduction ratio of the R image in the horizontal direction is Rm, $Rm=(W-R \times 2)/W$.

The image reduction process in the image horizontal direction is performed at the set reduction ratio, thereby generating the right eye correction image 112.

In addition, in this process example, it is assumed that $L \times 1 \cong R \times 2$.

The image processing apparatus determines display positions of the generated left eye correction image 111 and right eye correction image 112 on the display unit.

The display positions on the display unit are positions of the left eye correction image 111 and the right eye correction image 112 shown in FIG. 3A.

That is to say, if the dotted range of the transverse range=W (x=0 to w) shown for each of the left eye correction image 111 and the right eye correction image 112 in FIG. 3A is a display screen region of the display unit, the left eye correction image 111 has the position of x=L×1 to w as the display position.

The right eye correction image 112 has the position of x=0 to (w−R×2) as the display position.

As described above, the image processing apparatus determines display positions of the generated left eye correction image 111 and right eye correction image 112 on the display unit.

As shown in the left end of FIG. 3A, there will made a description of display positions of the left eye correction image 111 and right eye correction image 112 on the coordinates where the horizontal direction is x and the vertical direction is y.

In a case where the input LR images before being corrected are display on a display device without correction, both of the L image and the R image are displayed at the position of x=0 to w.

In contrast, the left eye correction image 111 generated through the reduction process has the horizontal direction width=(W−L×1).

The image processing apparatus performs a display position determination process such that a display position of the left eye correction image 111 is the position of x=L×1 to w.

In addition, the right eye correction image 112 generated through the reduction process has the horizontal direction width=(W−R×2).

The image processing apparatus performs a display position determination process such that a display position of the right eye correction image 112 is the position of x=0 to (w−R×2).

FIG. 3B is a diagram illustrating images perceived by the viewer in a case where the 3D images are displayed according to process results of the above-described image reduction process and display position determination process.

For convenience of description, the description will be made assuming that in a case where images having no parallax, that is, LR images which are input images before being corrected are displayed as 3D images as they are, a setting is performed such that subject images, that is, an object (apple) and an object (orange) included in the input LR images are displayed at the same positions as those in the LR images on the display unit.

In other words, it is assumed that in a case where the input LR images are displayed on the display unit as they are, the viewer perceives the object (apple) and the object (orange) as objects which are present at the depth position of the display surface of the display unit.

This setting has been described with reference to FIG. 1A.

The 3D images are displayed according to process results of the above-described image reduction process and the display position determination process, and thereby the viewer perceives the objects as if they are located at a perceived surface 122 shown in FIG. 3B.

In other words, the object (apple) and the object (orange) are viewed as if both of them are present on the perceived surface 122 which protruding forward from the display surface 121.

This is based on the principle described with reference to FIG. 2.

FIG. 3B shows distance information between the display surface and the perceived image in a case where a distance between the perceived surface 122 and the display surface 121 is a depth distance, and the left end depth and the right end depth are respectively set to the left end depth=ZL and the right end depth=ZR.

In addition, in the example shown in the figure, a deviation amount on the screen which is a factor generating parallax of each object is expressed as follows. Object deviation amount of the left object (apple)=(L×1)

Object deviation amount of the right object (orange)=(R×2)

In addition, object deviation amount=(L×1)≅(R×2)

Such deviation in the object deviation amount=(L×1)(R×2) is generated by the reduction and the display position control of the input LR images, parallax is generated through the processes, and each object is perceived as if it is present on the perceived surface 122 located further on the front side than the display surface 121.

Because the object deviation amount=(L×1)≅(R×2), the left and right end depths ZL and ZR in the display images are ZL≅ZR.

As such, in this process example 1, a display process is performed in which the overall display images are perceived further on the front side than the display surface.

In this example, as described above, in the input LR images before being corrected, if images where parallax is not set to the objects (apple and orange), that is, the input LR images are viewed as they are, the objects (apple and orange) are perceived such that they are located on the display surface.

The image processing apparatus control a parallax control by performing the reduction process and the display position control in the horizontal direction for the input LR images, and thus can display 3D images having parallax different from that of the input LR images.

In this example, there is realization of settings where the entire display screen can be perceived on the front side of the screen.

In addition, in this process example, the process is performed such that at least one of the left eye image and the right eye image is reduced in the transverse direction, and there is no image omission where images are outside the display surface, and thus the overall images which are desired to be displayed can be displayed on the display surface.

1-2. PROCESS EXAMPLE 2

Display Process Example Where Display Object is Perceived Further on Inner Side than Display Surface Next, as a process example 2, a display process example where a display object is perceived further on the inner side than the display surface will be described with reference to FIGS. 4A and 4B.

Figure 4A:
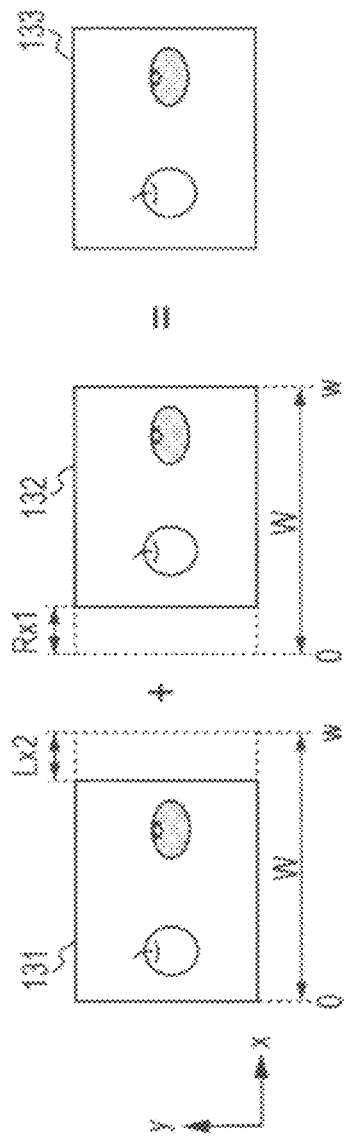
FIGS. 4A and 4B are diagrams illustrating an example of the process performed by the image processing apparatus according to the embodiment of the present disclosure.
Figure 4B:
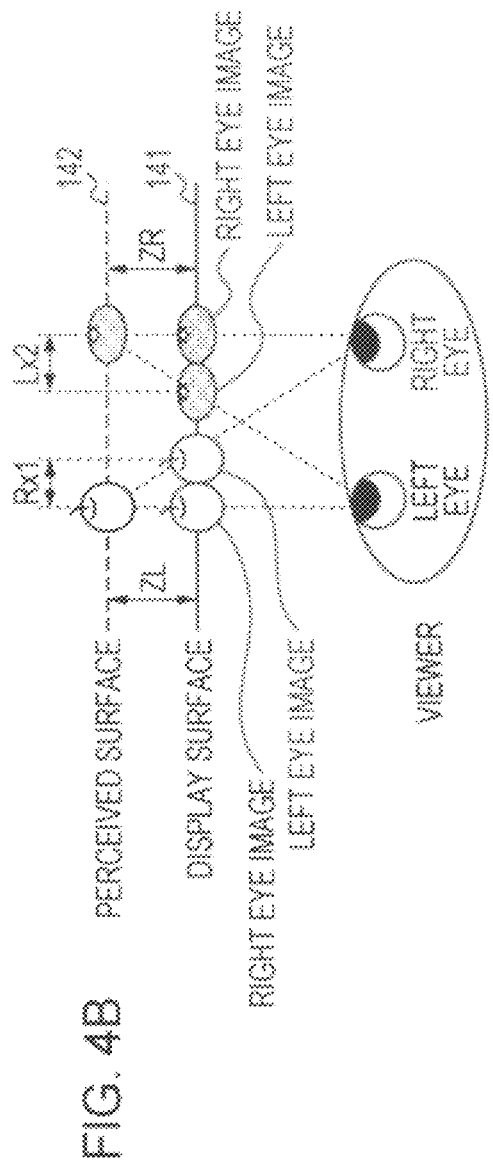

In a manner similar to FIGS. 3A and 3B, FIGS. 4A shows a display image generation example 2, and FIG. 4B shows a display image perception example 2 (all are depressed inward).

The display image generation example 2 of FIG. 4A shows a detailed example of the image process executed by the image processing apparatus according to the embodiment of the present disclosure.

As described above, in the image processing apparatus according to the embodiment of the present disclosure, a left eye image (L image) and a right eye image (R image) for 3D image display which are generated in advance are input; an image reduction process is performed for at least one of the LR images so as to generate corrected LR images; and, display positions of the corrected LR generated are determined.

The image processing apparatus receives LR images for 3D image display, captured from different viewpoints, such as, for example, LR images captured by a 3D image capturing camera or 3D broadcasting LR images received from a broadcasting station, and the image processing apparatus reprocesses the LR images so as to generate corrected LR images for output to the display unit.

In a manner similar to the process example described with reference to FIG. 3A, the example shown in FIG. 4A shows a process example where both of a left eye image (L image) and a right eye image (R image) which are input images are reduced in the horizontal direction, thereby generating a left eye correction image 131 and a right eye correction image 132.

The left eye correction image 131 and the right eye correction image 132 are output to a display device which can display 3D images as a 3D display image 133.

For example, the reduced left eye correction image 131 and the reduced right eye correction image 132 are alternately output, setting is performed such that a viewer wearing shutter-type glasses views the left eye correction image 131 only with the left eye and views the right eye correction image 132 only with the right eye, and thereby 3D images can be viewed.

The image correction process shown in FIG. 4A will be described in detail.

A width of original input LR images input to the image processing apparatus is denoted by W.

The image processing apparatus reduces the horizontal width of the input L image by L×2, and thus performs a reduction process where the image width of the L image in the horizontal direction is reduced from W to (W−L×2).

In other words, if a reduction ratio of the L image in the horizontal direction is Lm, Lm=(W−L×2)/W.

The image reduction process in the image horizontal direction is performed at the set reduction ratio, thereby generating the left eye correction image 131.

In addition, the image processing apparatus reduces a horizontal width of the R image by R×1, and thus performs a reduction process where the image width of the R image in the horizontal direction is reduced from W to (W−R×1).

In other words, if a reduction ratio of the R image in the horizontal direction is Rm, Rm=(W−R×1)/W.

The image reduction process in the image horizontal direction is performed at the set reduction ratio, thereby generating the right eye correction image 132.

In addition, in this process example, it is assumed that R×1≅L×2.

The image processing apparatus determines display positions of the generated left eye correction image 131 and right eye correction image 132 on the display unit.

The display positions on the display unit are positions of the left eye correction image 131 and the right eye correction image 132 shown in FIG. 4A.

That is to say, if the dotted range of the transverse range=W (x=0 to w) shown for each of the left eye correction image 131 and the right eye correction image 132 in FIG. 4A is a display screen region of the display unit, the left eye correction image 131 has the position of x=0 to (w−L×2) as the display position.

The right eye correction image 132 has the position of x=R×1 to w as the display position.

As described above, the image processing apparatus determines display positions of the generated left eye correction image 131 and right eye correction image 132 on the display unit.

As shown in the left end of FIG. 4A, there will made a description of display positions of the left eye correction image 131 and right eye correction image 132 on the coordinates where the horizontal direction is x and the vertical direction is y.

In a case where the input LR images before being corrected are display on a display device without correction, both of the L image and the R image are displayed at the position of x=0 to w.

In contrast, the left eye correction image 131 generated through the reduction process has the horizontal direction width=(W−L×2).

The image processing apparatus performs a display position determination process such that a display position of the left eye correction image 131 is the position of x=0 to (w−L×2).

In addition, the right eye correction image 132 generated through the reduction process has the horizontal direction width=(W−R×1).

The image processing apparatus performs a display position determination process such that a display position of the right eye correction image 132 is the position of x=R×1 to w.

FIG. 4B is a diagram illustrating images perceived by the viewer in a case where the 3D images are displayed according to process results of the above-described image reduction process and display position determination process. For convenience of description, the description will be made assuming that in a case where images having no parallax, that is, LR images which are input images before being corrected are displayed as 3D images as they are, a setting is performed such that subject images, that is, an object (apple) and an object (orange) included in the input LR images are displayed at the same positions as those in the LR images on the display unit.

In other words, it is assumed that in a case where the input LR images are displayed on the display unit as they are, the viewer perceives the object (apple) and the object (orange) as objects which are present at the depth position of the display surface of the display unit.

This setting has been described with reference to FIG. 1A.

The 3D images are displayed according to process results of the above-described image reduction process and the display position determination process, and thereby the viewer perceives the objects as if they are located at a perceived surface 142 shown in FIG. 4B.

In other words, the object (apple) and the object (orange) are viewed as if both of them are present on the perceived surface 142 which is depressed inward from the display surface 141.

This is based on the principle described with reference to FIG. 1B.

FIG. 4B shows distance information between the display surface and the perceived image in a case where a distance between the perceived surface 142 and the display surface 141 is a depth distance, and the left end depth and the right end depth are respectively set to the left end depth=ZL and the right end depth=ZR.

In addition, in the example shown in the figure, a deviation amount on the screen which is a factor generating parallax of each object is expressed as follows.

Object deviation amount of the left object (apple)=(R×1)
Object deviation amount of the right object (orange)=(L×2)

In addition, object deviation amount=(R×1)(L×2)

Such deviation in the object deviation amount=(R×1)≅(L×2) is generated by the reduction and the display position control of the input LR images, parallax is generated through the processes, and each object is perceived as if it is present on the perceived surface 142 which is further distant from the viewer than the display surface 141.

Because the object deviation amount=(R×1)≅(L×2), the left and right end depths ZL and ZR in the display images are ZL≅ZR.

As such, in this process example 2, a display process is performed in which the overall display images are perceived further at a distant position than the display surface.

In this example, as described above, in the input LR images before being corrected, if images where parallax is not set to the objects (apple and orange), that is, the input LR images are viewed as they are, the objects (apple and orange) are perceived such that they are located on the display surface.

The image processing apparatus control a parallax control by performing the reduction process and the display position control in the horizontal direction for the input LR images, and thus can display 3D images having parallax different from that of the input LR images.

In this example, there is realization of settings where the entire display screen can be perceived further at a distant position than the screen.

In addition, in this process example, the process is performed such that at least one of the left eye image and the right eye image is reduced in the transverse direction, and there is no image omission where images are outside the display surface, and thus the overall images which are desired to be displayed can be displayed on the display surface.

1-3. PROCESS EXAMPLE 3

Display Process Example Where Left Display Object is Perceived Further on Front Side and Right Display Object is Perceived Further on Inner Side than Display Surface Next, as a process example 3, a display process example where a left display object is perceived further on the front side and a right display object is perceived further on the inner side than the display surface will be described with reference to FIGS. 5A and 5B.

Figure 5A:
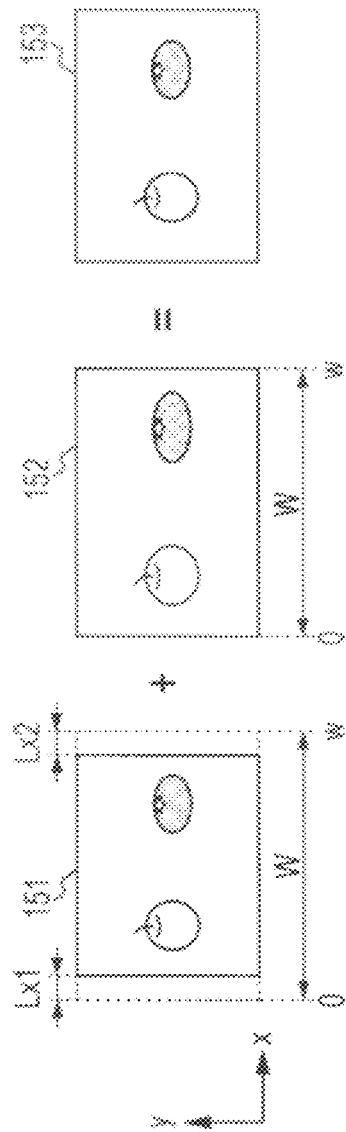
FIGS. 5A and 5B are diagrams illustrating an example of the process performed by the image processing apparatus according to the embodiment of the present disclosure.
Figure 5B:
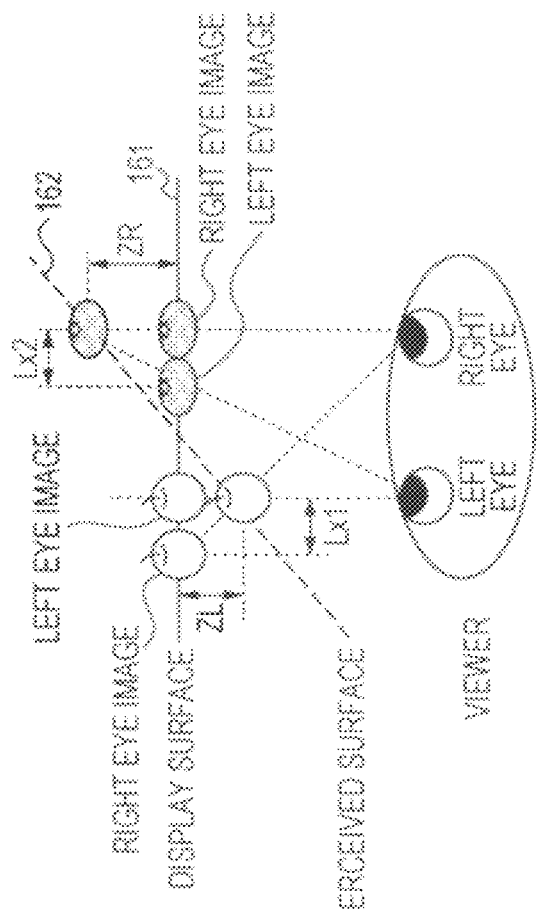

In a manner similar to FIGS. 3A to 4B, FIGS. 5A shows a display image generation example 3, and FIG. 5B shows a display image perception example 3 (the left display object protrudes forward and the right display object is depressed inward).

The display image generation example 3 of FIG. 5A shows a detailed example of the image process executed by the image processing apparatus according to the embodiment of the present disclosure.

As described above, in the image processing apparatus according to the embodiment of the present disclosure, a left eye image (L image) and a right eye image (R image) for 3D image display which are generated in advance are input; an image reduction process is performed for at least one of the LR images so as to generate corrected LR images; and, display positions of the corrected LR generated are determined.

The image processing apparatus receives LR images for 3D image display, captured from different viewpoints, such as, for example, LR images captured by a 3D image capturing camera or 3D broadcasting LR images received from a broadcasting station, and the image processing apparatus reprocesses the LR images so as to generate corrected LR images for output to the display unit.

In the example shown in FIG. 5A, only a left eye image (L image) which is an input image is reduced in the horizontal direction and then a left eye correction image 151 is generated.

An input right eye image (R image) is used as a right eye image 152 without reduction.

The left eye correction image 151 and the right eye image 152 are output to a display device which can display 3D images as a 3D display image 153.

For example, the reduced left eye correction image 151 and the right eye image 152 are alternately output, a setting is performed such that a viewer wearing shutter-type glasses views the left eye correction image 151 only with the left eye and views the right eye image 152 only with the right eye, and thereby 3D images can be viewed.

The image correction process shown in FIG. 5A will be described in detail.

A width of original input LR images input to the image processing apparatus is denoted by W.

The image processing apparatus reduces the horizontal width of the input L image by (L×1+L×2), and thus performs a reduction process where the image width of the L image in the horizontal direction is reduced from W to (W−(L×1+L×2)).

In other words, if a reduction ratio of the L image in the horizontal direction is Lm, Lm=(W−(L×1+L×2))/W.

The image reduction process in the image horizontal direction is performed at the set reduction ratio, thereby generating the left eye correction image 151.

In addition, in this process example, it is assumed that L×1≅L×2.

The input right eye image (R image) is used as the right eye image 152 without reduction.

The image processing apparatus determines display positions of the generated left eye correction image 151 and right eye image 152 on the display unit.

The display positions on the display unit are positions of the left eye correction image 151 and the right eye image 152 shown in FIG. 5A.

That is to say, if the dotted range of the transverse range=W (x=0 to w) shown for each of the left eye correction image 151 and the right eye image 152 in FIG. 5A is a display screen region of the display unit, the left eye correction image 151 has the position of x=L×1 to (w−L×2) as the display position.

The right eye image 152 has the position of x=0 to w as the display position.

As described above, the image processing apparatus determines display positions of the generated left eye correction image 151 and right eye image 152 on the display unit.

As shown in the left end of FIG. 5A, there will made a description of display positions of the left eye correction image 151 and right eye image 152 on the coordinates where the horizontal direction is x and the vertical direction is y.

In a case where the input LR images before being corrected are display on a display device without correction, both the L image and the R image are displayed at the position of x=0 to w.

In contrast, the left eye correction image 151 generated through the reduction process has the horizontal direction width=(W−(L×1+L×2)).

The image processing apparatus performs a display position determination process such that a display position of the left eye correction image 151 is the position of x=L×1 to (w−L×2).

In addition, the right eye image 152 generated through the reduction process has the horizontal direction width=0 to w.

The image processing apparatus performs a display position determination process such that a display position of the right eye correction image 152 is the position of x=0 to w.

FIG. 5B is a diagram illustrating images perceived by the viewer in a case where the 3D images are displayed according to process results of the above-described image reduction process and display position determination process.

For convenience of description, the description will be made assuming that in a case where images having no parallax, that is, LR images which are input images before being corrected are displayed as 3D images as they are, a setting is performed such that subject images, that is, an object (apple) and an object (orange) included in the input LR images are displayed at the same positions as those in the LR images on the display unit.

In other words, it is assumed that in a case where the input LR images are displayed on the display unit as they are, the viewer perceives the object (apple) and the object (orange) as objects which are present at the depth position of the display surface of the display unit.

This setting has been described with reference to FIG. 1A.

The 3D images are displayed according to process results of the above-described image reduction process and the display position determination process, and thereby the viewer perceives the objects as if they are located at a perceived surface 162 shown in FIG. 5B.

In other words, the left object (apple) is viewed as if it is present further on the front side than the display surface 161, and the right object (orange) is viewed as if it is present on the perceived surface 162 which is depressed inward from the display surface 161.

This is based on the principle described with reference to FIGS. 1B and 2.

FIG. 5B shows distance information between the display surface and the perceived image in a case where a distance between the perceived surface 162 and the display surface 161 is a depth distance, and the left end depth and the right end depth are respectively set to the left end depth=ZL and the right end depth=ZR.

In addition, in the example shown in the figure, a deviation amount on the screen which is a factor generating parallax of each object is expressed as follows.

Object deviation amount of the left object (apple)=(L×1)
Object deviation amount of the right object (orange)=(L×2)
In addition, object deviation amount=(L×1)(L×2)

Such deviation in the object deviation amount=(L×1)≅(L×2) is generated by the reduction and the display position control of the input LR images, and parallax is generated through the processes.

As a result, the left object (apple) is perceived further on the front side than the display surface 161, and the right object (orange) is perceived at a position which is further distant from the viewer than the display surface 161.

In other words, the respective objects are perceived as if they are present on the perceived surface 162 which is tilted such that the left side is located further at a front position than the display surface 161 and the right side is located further at an inner position than the display surface 162.

Because the object deviation amount=(L×1)(L×2), the left and right end depths ZL and ZR in the display images are ZL≅ZR.

As such, in this process example 3, a display process is performed in which the respective objects are perceived as if they are present on the perceived surface 162 which is tilted such that the left side is located further at a front position than the display surface 161 and the right side is located further at an inner position than the display surface 162.

In this example, as described above, in the input LR images before being corrected, if images where parallax is not set to the objects (apple and orange), that is, the input LR images are viewed as they are, the objects (apple and orange) are perceived such that they are located on the display surface.

The image processing apparatus control a parallax control by performing the reduction process and the display position control in the horizontal direction for the input LR images, and thus can display 3D images having parallax different from that of the input LR images.

In this example, the display process is performed in which the respective objects are perceived as if they are present on the perceived surface which is tilted such that the left side is located further at a front position than the display surface and the right side is located further at an inner position than the display surface.

In addition, in this process example, the process is performed such that at least one of the left eye image and the right eye image is reduced in the transverse direction, and there is no image omission where images are outside the display surface, and thus the overall images which are desired to be displayed can be displayed on the display surface.

1-4. PROCESS EXAMPLE 4

Display Process Example Where Left Display Object is Perceived Further on Inner Side and Right Display Object is Perceived Further on Front Side than Display Surface Next, as a process example 4, a display process example where a left display object is perceived further on the inner side and a right display object is perceived further on the front side than the display surface will be described with reference to FIGS. 6A and 6B.

Figure 6A:
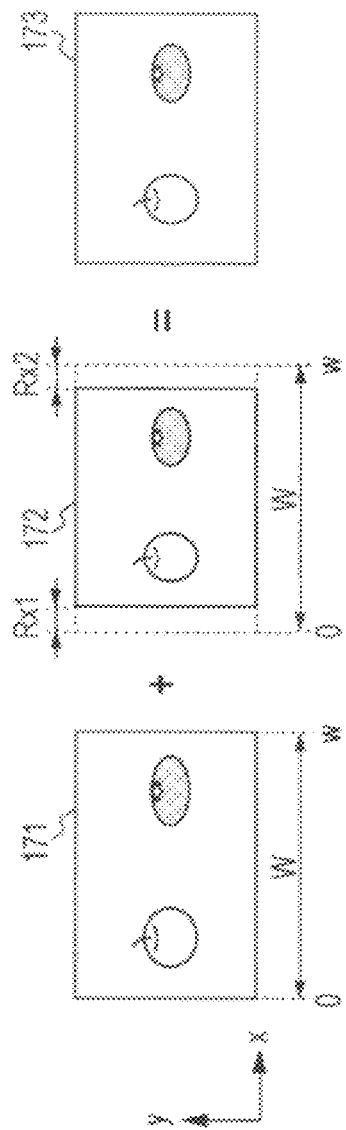
FIGS. 6A and 6B are diagrams illustrating an example of the process performed by an image processing apparatus according to the embodiment of the present disclosure.
Figure 6B:
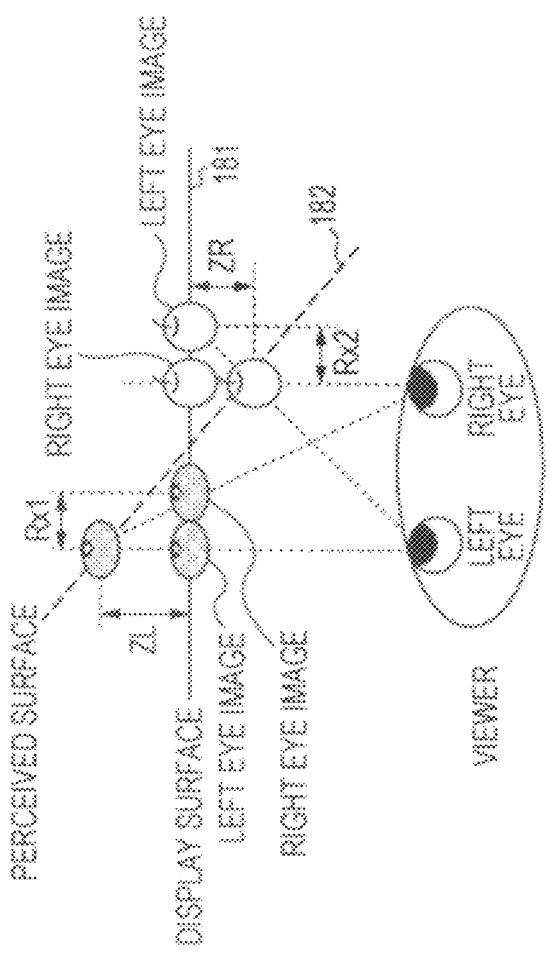

In a manner similar to FIGS. 3A to 5B, FIGS. 6A shows a display image generation example 4, and FIG. 6B shows a display image perception example 4 (the left display object is depressed inward and the right display object protrudes forward).

The display image generation example 4 of FIG. 6A shows a detailed example of the image process executed by the image processing apparatus according to the embodiment of the present disclosure.

As described above, in the image processing apparatus according to the embodiment of the present disclosure, a left eye image (L image) and a right eye image (R image) for 3D image display which are generated in advance are input; an image reduction process is performed for at least one of the LR images so as to generate corrected LR images; and, display positions of the corrected LR generated are determined.

The image processing apparatus receives LR images for 3D image display, captured from different viewpoints, such as, for example, LR images captured by a 3D image capturing camera or 3D broadcasting LR images received from a broadcasting station, and the image processing apparatus reprocesses the LR images so as to generate corrected LR images for output to the display unit.

In the example shown in FIG. 6A, only a right eye image (R image) which is an input image is reduced in the horizontal direction and then a right eye correction image 172 is generated.

An input left eye image (L image) is used as a left eye image 171 without reduction.

The left eye image 171 and the right eye correction image 172 are output to a display device which can display 3D images as a 3D display image 173.

For example, the left eye image 171 and the reduced right eye correction image 172 are alternately output, setting is performed such that a viewer wearing shutter-type glasses views the left eye image 171 only with the left eye and views the right eye correction image 172 only with the right eye, and thereby 3D images can be viewed.

The image correction process shown in FIG. 6A will be described in detail.

A width of original input LR images input to the image processing apparatus is denoted by W.

The image processing apparatus uses the input left eye image (L image) as the left eye image 171 without reduction.

The image processing apparatus reduces the horizontal width of the input R image by (R×1+R×2), and thus performs a reduction process where the image width of the R image in the horizontal direction is reduced from W to (W−(R×1+R×2)).

In other words, if a reduction ratio of the R image in the horizontal direction is Rm, Rm=(W−(R×1+R×2))/W.

The image reduction process in the image horizontal direction is performed at the set reduction ratio, thereby generating the right eye correction image 172.

In addition, in this process example, it is assumed that R×1≅R×2.

The image processing apparatus determines display positions of the generated left eye image 171 and right eye correction image 172 on the display unit.

The display positions on the display unit are positions of the left eye image 171 and the right eye correction image 172 shown in FIG. 6A.

That is to say, if the dotted range of the transverse range=W (x=0 to w) shown for each of the left eye image 171 and the right eye correction image 172 in FIG. 6A is a display screen region of the display unit, the left eye image 171 has the position of x=0 to w as the display position.

The right eye correction image 172 has the position of x=R×1 to (w−R×2) as the display position.

As described above, the image processing apparatus determines display positions of the generated left eye image 171 and right eye correction image 172 on the display unit.

As shown in the left end of FIG. 6A, there will made a description of display positions of the left eye image 171 and right eye correction image 172 on the coordinates where the horizontal direction is x and the vertical direction is y.

In a case where the input LR images before being corrected are display on a display device without correction, both of the L image and the R image are displayed at the position of x=0 to w.

In contrast, the right eye correction image 172 generated through the reduction process has the horizontal direction width=(W−(R×1+R×2)).

The image processing apparatus performs a display position determination process such that a display position of the right eye correction image 172 is the position of x=R×1 to (w−R×2).

In addition, the left eye image 171 generated through the reduction process has the horizontal direction width W=0 to w.

The image processing apparatus performs a display position determination process such that a display position of the left eye image 171 is the position of x=0 to w.

FIG. 6B is a diagram illustrating images perceived by the viewer in a case where the 3D images are displayed according to process results of the above-described image reduction process and display position determination process.

For convenience of description, the description will be made assuming that in a case where images having no parallax, that is, LR images which are input images before being corrected are displayed as 3D images as they are, setting is performed such that subject images, that is, an object (apple) and an object (orange) included in the input LR images are displayed at the same positions as those in the LR images on the display unit.

In other words, it is assumed that in a case where the input LR images are displayed on the display unit as they are, the viewer perceives the object (apple) and the object (orange) as objects which are present at the depth position of the display surface of the display unit.

This setting has been described with reference to FIG. 1A.

The 3D images are displayed according to process results of the above-described image reduction process and the display position determination process, and thereby the viewer perceives the objects as if they are located at a perceived surface 182 shown in FIG. 6B.

In other words, the left object (apple) is perceived further at a depressed (distant) position than the display surface 181, and the right object (orange) is perceived further on the front side than the display surface 161. That is to say, the objects are viewed as if they are present on the perceived surface 182.

This is based on the principle described with reference to FIGS. 1B and 2.

FIG. 6B shows distance information between the display surface and the perceived image in a case where a distance between the perceived surface 182 and the display surface 181 is a depth distance, and the left end depth and the right end depth are respectively set to the left end depth=ZL and the right end depth=ZR.

In addition, in the example shown in the figure, a deviation amount on the screen which is a factor generating parallax of each object is expressed as follows.

Object deviation amount of the left object (apple)=(R×1)

Object deviation amount of the right object (orange)=(R×2)

In addition, object deviation amount=(R×1)≅(R×2)

Such deviation in the object deviation amount=(R×1)≅(R×2) is generated by the reduction and the display position control of the input LR images, and parallax is generated through the processes.

As a result, the left object (apple) is perceived further on the inner side than the display surface 181, and the right object (orange) is perceived further on the front side than the display surface 181.

In other words, the respective objects are perceived as if they are present on the perceived surface 182 which is tilted such that the left side is located further at an inner position than the display surface 181 and the right side is located further at a front position than the display surface 182.

Because the object deviation amount=(R×1)≅(R×2), the left and right end depths ZL and ZR in the display images are ZL≅ZR.

As such, in this process example 4, a display process is performed in which the respective objects are perceived as if they are present on the perceived surface 182 which is tilted such that the left side is located further at an inner position than the display surface 181 and the right side is located further at a front position than the display surface 181.

In this example, as described above, in the input LR images before being corrected, if images where parallax is not set to the objects (apple and orange), that is, the input LR images are viewed as they are, the objects (apple and orange) are perceived such that they are located on the display surface.

The image processing apparatus control a parallax control by performing the reduction process and the display position control in the horizontal direction for the input LR images, and thus can display 3D images having parallax different from that of the input LR images.

In this example, the display process is performed in which the respective objects are perceived as if they are present on the perceived surface which is tilted such that the left side is located further at an inner position than the display surface and the right side is located further at a front position than the display surface.

In addition, in this process example, the process is performed such that at least one of the left eye image and the right eye image is reduced in the transverse direction, and there is no image omission where images are outside the display surface, and thus the overall images which are desired to be displayed can be displayed on the display surface.

In addition, the perceived surface shown in FIGS. 5A and 5B or 6A and 6B is displayed so as to be tilted and viewed obliquely, and thereby an on-screen display (OSD) such as a time code or a menu displayed on a stereoscopic image display device can be displayed so as to be tilted and viewed obliquely. For example, in a case where the display surface is formed by a touch panel, the tilted display can be applied to a display method of touch UI, or in a case of a noncontact touch panel, an operation a button floating forward is touched can be performed. In addition, the tilted display can be used for a variety of image display in 3D games.

2. CONFIGURATION OF AND PROCESS IN IMAGE PROCESSING APPARATUS

Next, a configuration of and a process in the image processing apparatus according to an embodiment of the present disclosure will be described with reference to FIG. 7 and thereafter.

Figure 7:
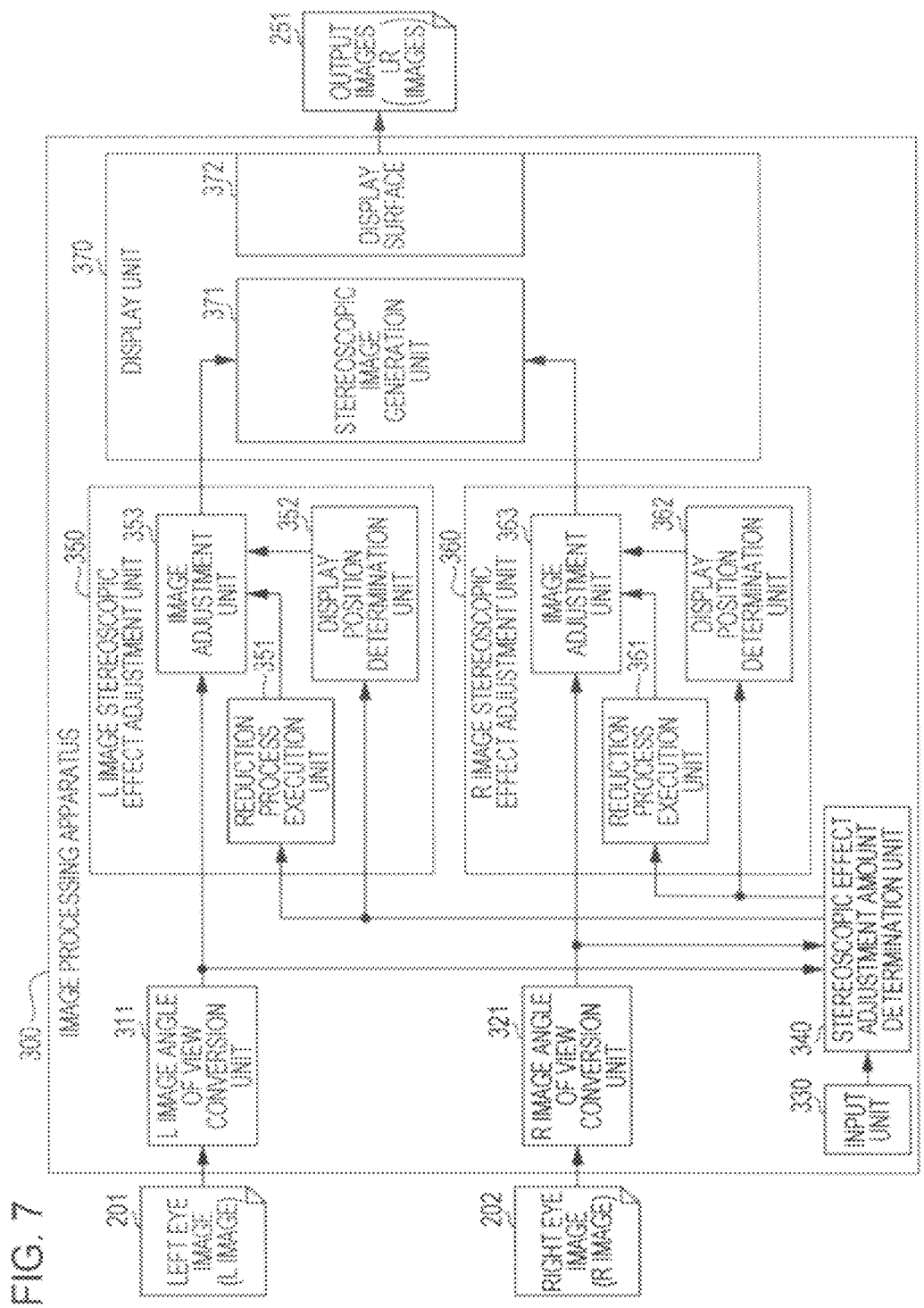
FIG. 7 is a diagram illustrating a configuration example of the image processing apparatus according to the embodiment of the present disclosure.

The image processing apparatus 300 shown in FIG. 7 receives a left eye image (L image) 201 and a right eye image (R image) 202 for 3D image display, performs an image process for the input images, and generates output images 251 which is output to a display unit such as, for example, a television set capable of displaying 3D images.

The image processing apparatus 300 includes an L image angle of view conversion unit 311 and an R image angle of view conversion unit 321 which adjust angles of view of the input LR images to the size of an allowable display region of an output display surface.

In addition, the image processing apparatus 300 includes an L image stereoscopic effect adjustment unit 350 which performs a process for the input L image 201 and an R image stereoscopic effect adjustment unit 360 which performs a process for the input R image 202, as processing units which perform the reduction process or the display position determination process, described with reference to FIGS. 3A to 6B, for the input LR images.

The L image stereoscopic effect adjustment unit 350 has a reduction process execution portion 351, a display position determination portion 352, and an image adjustment portion 353.

The R image stereoscopic effect adjustment unit 360 has a reduction process execution portion 361, a display position determination portion 362, and an image adjustment portion 363.

In addition, the image processing apparatus 300 includes a display unit 370 having a display surface 372 which emits light in practice using a backlight or a self-emission material and displays stereoscopic images in a parallax barrier type or a polarization type, and a stereoscopic image synthesis portion 371.

In addition, the image processing apparatus 300 includes an input unit 330 to which information is input from a user, and a stereoscopic effect adjustment amount determination unit 340 which determines a stereoscopic effect adjustment amount in response to input information from the input unit 330 or default information set in advance.

Although not shown in the figure, the image processing apparatus 300 includes a control unit which controls processes of the respective constituent elements, and a memory which stores programs, process parameters, and the like, in executed in the control unit.

Processes executed by the image processing apparatus 300 shown in FIG. 7 will be described.

First, examples of the left eye image (L image) 201 and the right eye image (R image) 202 which are input images will be described with reference to FIGS. 8A to 8C.

As described above, the image processing apparatus 300 receives the left eye image (L image) 201 and the right eye image (R image) 202 for 3D image display, which are generated in advance. In other words, the left eye image (L image) 201 and the right eye image (R image) 202 for 3D image display input to the image processing apparatus 300 are images captured from different viewpoints, and are images to which parallax is set according to a subject distance as described with reference to FIGS. 1A to 2. For example, the left eye image (L image) 201 and the right eye image (R image) 202 for 3D image display are LR images for 3D image display captured from different viewpoints such as LR images captured by a 3D image capturing camera, or LR images for 3D broadcasting received from a broadcasting station.

Figure 8:
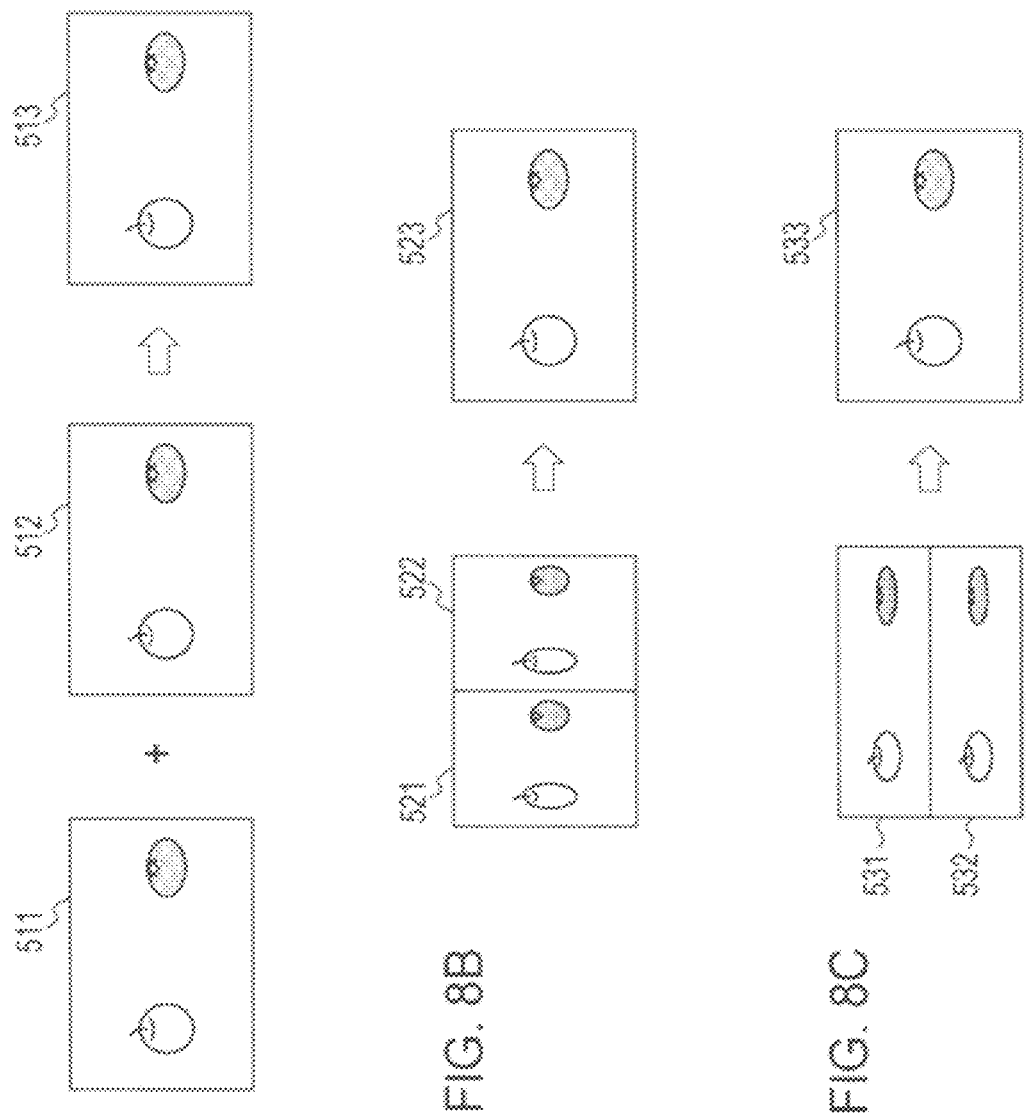
FIGS. 8A to 8C are diagrams illustrating examples of the images input to the image processing apparatus according to the embodiment of the present disclosure.

FIGS. 8A to 8C are diagrams illustrating examples of the transmission form of the LR images, where FIG. 8A shows a frame sequential scheme where the LR images are alternately transmitted for each frame; FIG. 8B shows a side-by-side scheme where the LR images are stored in left and right regions into which a frame is divided and are transmitted; and FIG. 8C shows a top-and-bottom scheme where the LR images are stored in top and bottom regions into which a frame is divided and are transmitted.

For example, the LR images transmitted in such transmission schemes are input to the image processing apparatus 300.

The L image angle of view conversion unit 311 and the R image angle of view conversion unit 321 of the image processing apparatus 300 first adjust the input LR images so as to be suitable for the size of the display region of the display surface 372 of the display unit 370.

Specifically, for example, in the examples described with reference to FIGS. 3A to 6B, a process is performed in which the image width is adjusted to W=0 to w. The image height is also adjusted so as to be suitable for the height of the display surface 372.

Next, an example of the input information from the input unit 330 will be described with reference to FIG. 9.

Information for setting, for example, a stereoscopic effect is input to the input unit 330 by a user. Specifically, for example, the following information is input.

Left depth information ZL and right depth information ZR are input.

The depth information ZL and ZR correspond to the depth information described with reference to FIGS. 3A to 6B, and correspond to distances from the display surface.

Figure 9:
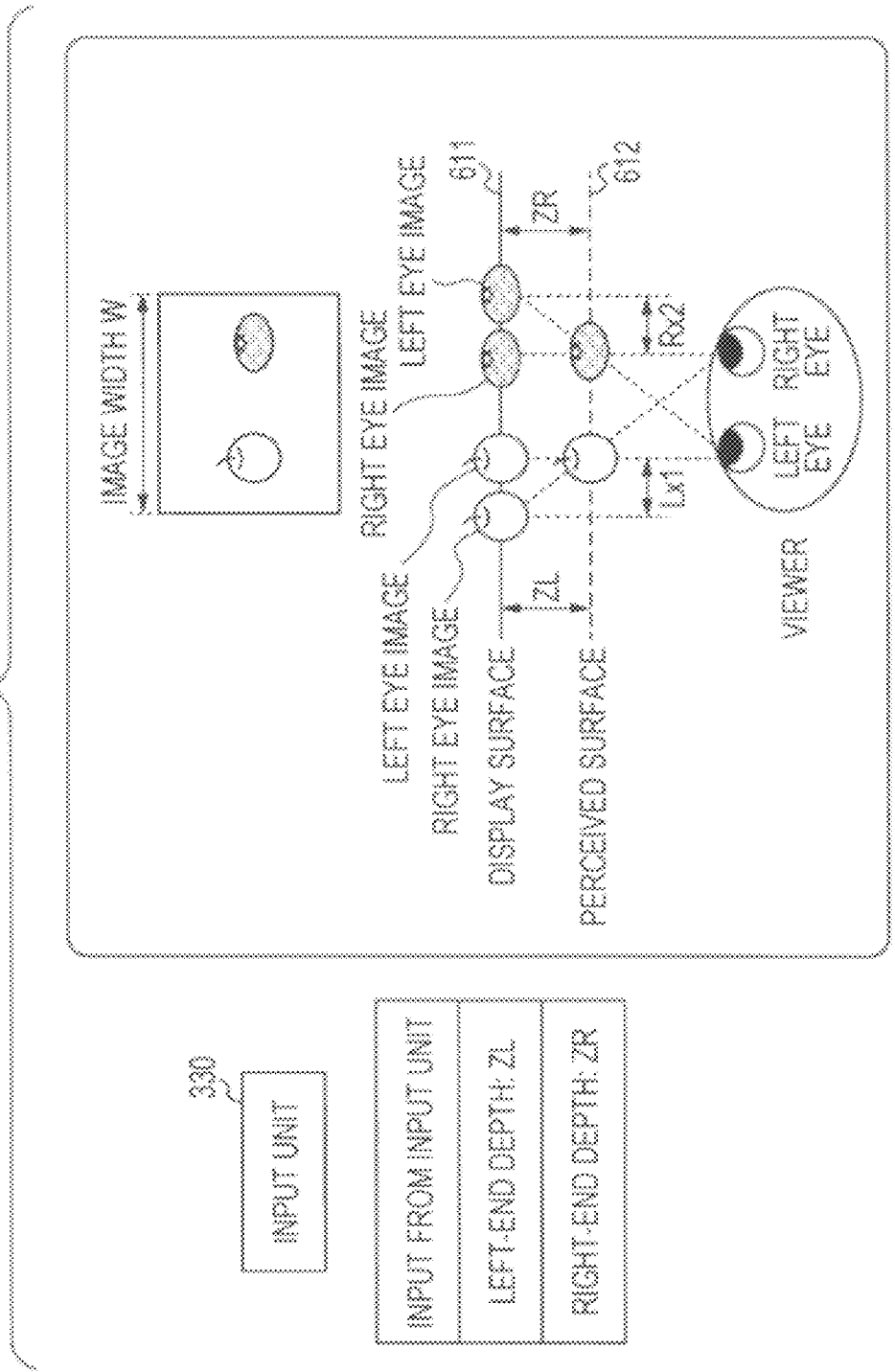
FIG. 9 is a diagram illustrating an example of the process performed by an image processing apparatus according to the embodiment of the present disclosure.

That is to say, as shown in FIG. 9, the depth information ZL and ZR are values corresponding to distances between the display surface 611 and the perceived surface 612.

In the following embodiment, there will be made a description of an example where, with respect to a position of the display surface of 0, the front side (close to a viewer) of the display surface is set to negative (−), and the inner side (distant from the viewer) of the display surface is set to positive (+).

For example, it is assumed that an allowable setting range of the parameters are ZL=−50 to +50, and ZR=−50 to +50, and these allowable values are set.

In this setting, if a user inputs parameters of ZL=−50 and ZR=−50, as described with reference to FIGS. 3A and 3B, a 3D image display control is performed such that the perceived surface is set further on the front side (a position close to a viewer) than the display surface.

In addition, if a user inputs parameters of ZL=+50 and ZR=+50, as described with reference to FIGS. 4A and 4B, a 3D image display control is performed such that the perceived surface is set further on the inner side (a position distant from a viewer) than the display surface.

Further, if a user inputs parameters of ZL=−50 and ZR=+50, as described with reference to FIGS. 5A and 5B, a 3D image display control is performed such that the left side of the perceived surface is set further on the front side (a position close to a viewer) than the display surface and the right side thereof is set further on the inner side (a position distant from the viewer) than the display surface.

Correspondence relationships between setting forms of the parameters ZL and ZR and control examples of the perceived surface will be described with reference to FIG. 10. FIG. 10 shows the following parameter setting examples.

That is to say, (1) of FIG. 10 shows typical stereoscopic display when ZL and ZR are 0.

(2) of FIG. 10 shows that the entire perceived surface is set further on the inner side (a position distant from a viewer) than the display surface when ZL and ZR are positive numbers.

(3) of FIG. 10 shows that the entire perceived surface is set further on the front side (a position close to a viewer) than the display surface when ZL and ZR are negative numbers when ZL and ZR are negative numbers.

(4) of FIG. 10 shows that the left side (L) of the perceived surface is set further on the front side (a position close to a viewer) than the display surface and the right side (R) is set further on the inner side (a position distant from the viewer) than display surface when ZL is a negative number and ZR is a positive number.

(5) of FIG. 10 shows that the left side (L) of the perceived surface is set at a position of the display surface and the right side (R) thereof is set further on the front side (a position close to a viewer) than display surface when ZL is 0 and ZR is a negative number. For example, controls for the settings are possible.

Next, a process example performed by the stereoscopic effect adjustment amount determination unit 340 will be described with reference to FIG. 11.

The stereoscopic effect adjustment amount determination unit 340 determines a stereoscopic effect adjustment amount in response to information input from the input unit 330, or default information set in advance.

As described above, the left depth information ZL and the right depth information ZR are input from the input unit 330.

The stereoscopic effect adjustment amount determination unit 340 determines an adjustment amount (control parameter) for performing a variety of image correction and for setting image display positions described with reference to FIGS. 3A to 6B, based on the information.

Figure 11:
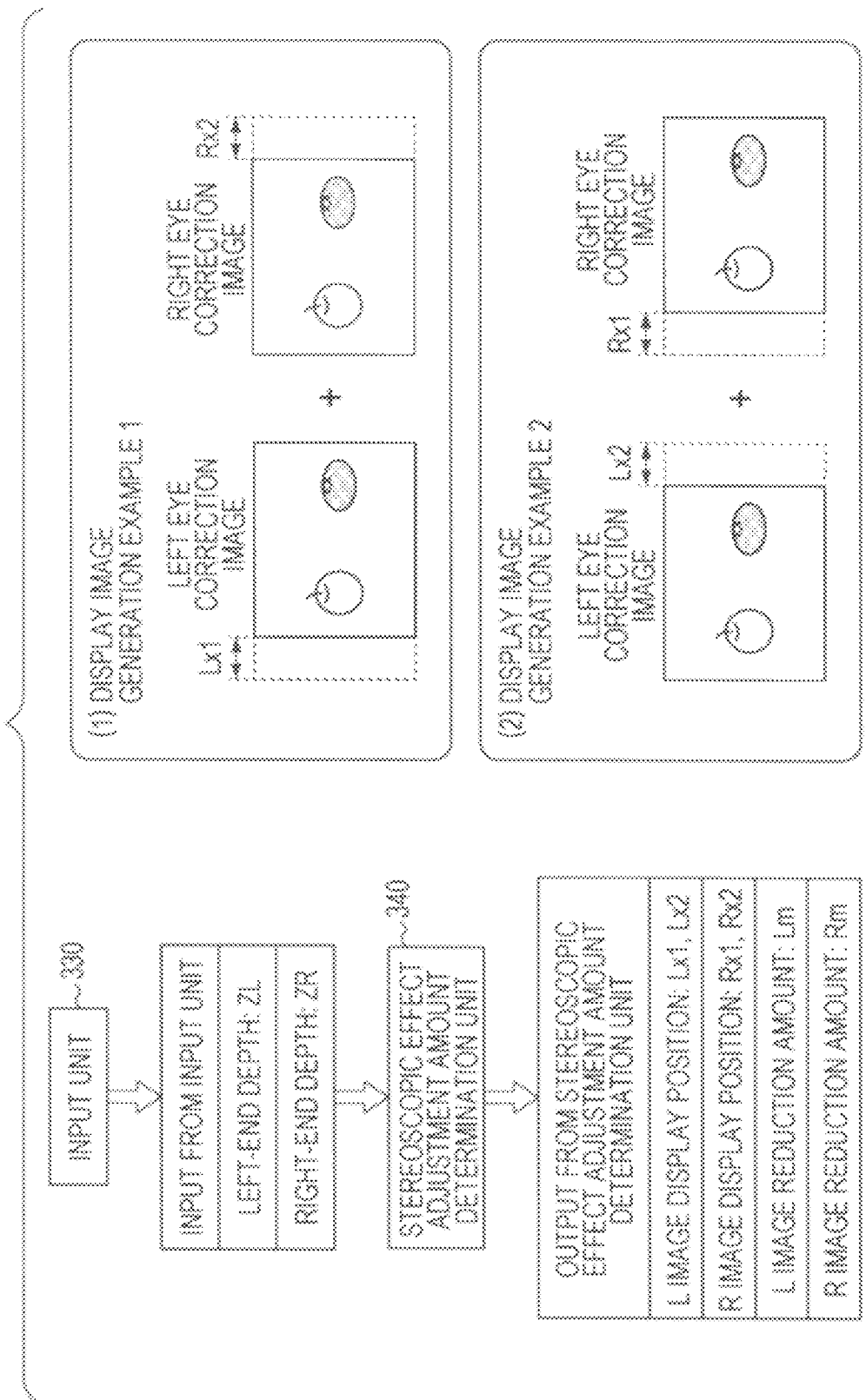
FIG. 11 is a diagram illustrating an example of the process performed by an image processing apparatus according to the embodiment of the present disclosure.

Specifically, as shown in FIG. 11, the stereoscopic effect adjustment amount determination unit 340 determines adjustment amounts (control parameters) of the L image display positions L×1 and L×2, the R image display positions R×1 and R×2, the L image reduction ratio Lm, and the R image reduction ratio Rm.

In addition, L×1 denotes a display position of the left end of the left eye image (L image); L×2 denotes a display position of the right end of the left eye image (L image); R×1 denotes a display position of the left end of the right eye image (R image); and R×2 denotes a display position of the right end of the right eye image (R image).

In other words, the transverse width of the left eye image (L image) is (L×2−L×1), and the transverse width of the right eye image (R image) is (R×2−R×1).

Therefore, if the width of the display surface is denoted by W, the L image reduction ratio Lm is calculated by (W−(L×2−L×1))/W, and the R image reduction ratio Rm is calculated by (W−(R×2−R×1))/W.

Each position of the L image display positions L×1 and L×2 and the R image display positions R×1 and R×2 is determined according to the following depth information input from the input unit 330.

Left depth information ZL and right depth information ZR

As described with reference to FIGS. 3A to 6B and 10, for example, in a case where the left side of the perceived surface is displayed on the front side of the display surface (screen), ZL<0, and, in this case, a setting may be performed so as to satisfy a condition of L×1>R×1.

This corresponds to the settings in FIGS. 3A and 3B, and FIGS. 5A and 5B.

In addition, in a case where the left side of the perceived surface is displayed on the inner side, ZL<0, and, in this case, a setting may be performed so as to satisfy a condition of L×1<R×1.

This corresponds to the settings in FIGS. 4A and 4B, and FIGS. 6A and 6B.

Further, in a case where the right side of the perceived surface is displayed on the front side of the display surface (screen), ZR<0, and, in this case, a setting may be performed so as to satisfy a condition of L×2<R×2.

This corresponds to the settings in FIGS. 3A and 3B, and FIGS. 6A and 6B.

In addition, in a case where the right side of the perceived surface is displayed on the inner side, ZR>0, and, in this case, a setting may be performed so as to satisfy a condition of L×2>R×2.

This corresponds to the settings in FIGS. 4A and 4B, and FIGS. 5A and 5B.

The stereoscopic effect adjustment amount determination unit 340 determines display positions of the L image display positions L×1 and L×2 and the R image display positions R×1 and R×2 according to, for example, the left depth information ZL and the right depth information ZR input from the input unit 330, so as to satisfy the above-described conditions.

In addition, the stereoscopic effect adjustment amount determination unit 340 stores a calculation expression, algorithm, or table set to satisfy the above-described conditions, and calculates the L image display positions L×1 and L×2 and the R image display positions R×1 and R×2 according to the depth information ZL and ZR input from the input unit 330, based on the stored date.

In addition, the stereoscopic effect adjustment amount determination unit 340 applies the calculated values of the L image display positions L×1 and L×2 and the R image display positions R×1 and R×2, thereby calculating the L image reduction ratio Lm and the R image reduction ratio Rm.

The parameters generated by the stereoscopic effect adjustment amount determination unit 340, that is, the L image display positions L×1 and L×2, the R image display positions Rx1 and Rx2, the L image reduction ratio Lm, and the R image reduction ratio Rm are provided to the L image stereoscopic effect adjustment unit 350 and the R image stereoscopic effect adjustment unit 360.

The L image stereoscopic effect adjustment unit 350 and the R image stereoscopic effect adjustment unit 360 perform a reduction process and an enlargement process in the transverse direction for at least any ones of left eye images and right eye images, and generate corrected images where parallax is adjusted.

Figure 12:
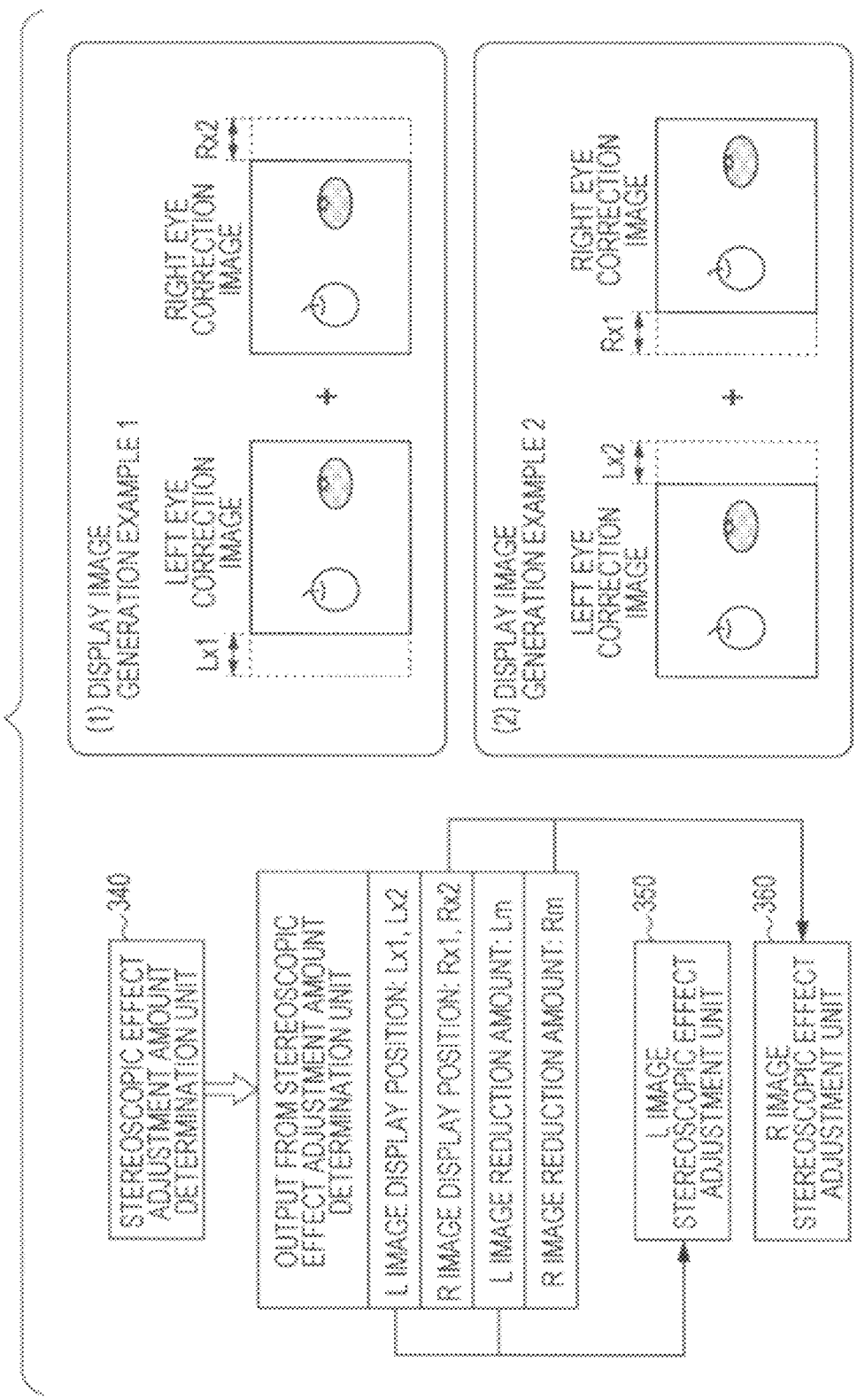
FIG. 12 is a diagram illustrating an example of the process performed by an image processing apparatus according to the embodiment of the present disclosure.

This process will be described with reference to FIG. 12.

The L image related control parameters generated by the stereoscopic effect adjustment amount determination unit 340, that is, the L image display positions L image display positions Lx1 and Lx2 and the L image reduction ratio Lm are input to the L image stereoscopic effect adjustment unit 350.

The reduction process execution portion 351 of the L image stereoscopic effect adjustment unit 350 executes a reduction process in the transverse direction for the L image according to the L image reduction ratio Lm.

In addition, the display position determination portion 352 of the L image stereoscopic effect adjustment unit 350 determines a display position of the L image according to the L image display positions Lx1 and Lx2.

Further, the image adjustment portion 353 executes other image adjustments necessary to display the reduced L image at the determined position so as to be output to the stereoscopic image synthesis portion 371 of the display unit 370.

In the same manner, the R image related control parameters generated by the stereoscopic effect adjustment amount determination unit 340, that is, the R image display positions R image display positions Rx1 and Rx2 and the R image reduction ratio Rm are input to the R image stereoscopic effect adjustment unit 360.

The reduction process execution portion 361 of the R image stereoscopic effect adjustment unit 360 executes a reduction process in the transverse direction for the R image according to the R image reduction ratio Rm.

In addition, the display position determination portion 362 of the R image stereoscopic effect adjustment unit 360 determines a display position of the R image according to the R image display positions Rx1 and Rx2.

Further, the image adjustment portion 363 executes other image adjustments necessary to display the reduced R image at the determined position so as to be output to the stereoscopic image synthesis portion 371 of the display unit 370.

The stereoscopic image synthesis portion 371 of the display unit 370 performs a process for displaying the L images input from the L image stereoscopic effect adjustment unit 350 and the R images input from the R image stereoscopic effect adjustment unit 360 on the display surface 372 according to a predefined 3D image display format.

For example, the left eye correction image and the right eye correction image at least one of which is reduced are alternately output, a setting is performed such that a viewer wearing the shutter type glasses views the left eye correction image only with the left eye and the right eye correction image only with the right eye, and thereby the corrected images can be viewed as 3D images on the perceived surface described, for example, with reference to FIGS. 3A to FIG. 6B.

3. PROCESS SEQUENCE EXECUTED BY IMAGE PROCESSING APPARATUS

Next, a process sequence executed by the image processing apparatus will be described with reference to the flowchart shown in FIG. 13.

In step S101, an angle of view conversion is performed for input LR images so as to be suitable for the display unit.

This process is a process performed by the L image angle of view conversion unit 311 and the R image angle of view conversion unit 321 shown in FIG. 7. The L image angle of view conversion unit 311 and the R image angle of view conversion unit 321 adjust an angle of view of the input LR images to the size of the allowable display region of the output display surface.

In addition, a luminance component or a chrominance component may be adjusted so as to be suitable for a feature of the display surface.

Next, in step S102, it is determined whether or not a display adjustment request from a user is input via the input unit. This is a process for determining whether or not stereoscopic effect setting information input from the input unit 330 which has been described with reference to FIGS. 7 and 9, specifically, the left depth information ZL and the right depth information ZR are input.

If the information is input, the determination result in step S102 is affirmative (Yes), and the flow proceeds to step S104.

If the information is not input, the flow proceeds to step S103.

In step S103, setting values (the left depth information ZL and the right depth information ZR) are determined based on metadata (attribute information) which is included and set in the input LR images, or preset values (default values) are used.

In step S103, for example, results of detecting luminance components, chrominance components, and the like of the input images may be compared with each other, and setting values (the left depth information ZL and the right depth information ZR) may be calculated based on feature amounts such as deviations of feature points of the left eye image and the right eye image.

In step S104, control parameters (adjustment amounts) for reduction correction of images or for setting display positions thereof are determined on the basis of the setting values based on the user input, the metadata, or the default value.

Specifically, as described with reference to FIG. 11, adjustment amounts (control parameters) of the L image display positions Lx1 and Lx2, the R image display positions Rx1 and Rx2, the L image reduction ratio Lm, and the R image reduction ratio Rm, are determined.

In step S104, for example, it is possible to determine reduction ratios in the horizontal direction and image output positions in the horizontal direction necessary to adjust a stereoscopic effect from the input feature amounts based on calculation methods set in advance using the table value, the calculation algorithm, or the like stored in the stereoscopic effect adjustment amount determination unit 340.

The processes in steps S102 to S104 are executed by the stereoscopic effect adjustment amount determination unit 340 shown in FIG. 7.

Next, in step S105, correction of the LR images and setting of display positions thereof are performed based on the control parameters (adjustment amounts).

The process is executed by the L image stereoscopic effect adjustment unit 350 and the R image stereoscopic effect adjustment unit 360 shown in FIG. 7.

Finally, in step S106, 3D images are displayed using the corrected LR images.

This process is executed by the display unit 370 shown in FIG. 7.

The left eye correction image and the right eye correction image at least one of which is reduced are alternately output, a setting is performed such that a viewer wearing the shutter type glasses views the left eye correction image only with the left eye and the right eye correction image only with the right eye, and thereby the corrected images can be viewed as 3D images on the perceived surface described, for example, with reference to FIGS. 3A to FIG. 6B.

In addition, although, in the above-described embodiment, a process example where at least any ones of the left eye images and right eye images are reduced has been described, even in a case where a process where at least any ones of the left eye images and right eye images are enlarged is performed, a stereoscopic effect control is possible through parallax adjustment, and an enlargement process may be performed instead of the reduction process. Alternatively, both the processes may be combined and used.

4. CONCLUSION OF CONFIGURATION ACCORDING TO PRESENT DISCLOSURE

As above, the embodiment of the present disclosure has been described in detail with reference to specific embodiments. However, it is obvious that a person skilled in the art can make modifications or alternatives of the embodiment in the scope without departing from the spirit of the present disclosure. In other words, because the present embodiment is disclosed as a form of an example, it should not be construed as limiting the present disclosure. The claims should be considered in order to judge the spirit of the present disclosure.

In addition, the technique disclosed in the present specification may employ the following configurations.

(1) An image processing apparatus including a stereoscopic effect adjustment unit that receives left eye images and right eye images applied to three-dimensional image display, and performs stereoscopic effect adjustment by correcting the received images which are input images, wherein the stereoscopic effect adjustment unit performs a reduction process or an enlargement process in a transverse direction for at least any ones of the left eye images and the right eye images, and generates corrected images where parallax is adjusted.

(2) The image processing apparatus set forth in (1), wherein the stereoscopic effect adjustment unit determines display positions of the corrected images generated by reducing or enlarging at least any ones of the left eye images and the right eye images in the transverse direction, on a display unit.

(3) The image processing apparatus set forth in (1) or (2), further including an input unit to which image setting information can be input; and a stereoscopic effect adjustment amount determination unit that determines control parameters for determining image correction types according to the image setting information input from the input unit, wherein the stereoscopic effect adjustment unit performs an image correction process and a display position determination process according to the control parameters determined by the stereoscopic effect adjustment amount determination unit.

(4) The image processing apparatus set forth in any one of (1) to (3), wherein the image setting information input from the input unit is left and right end portion depth information ZL and ZR of display images, wherein the stereoscopic effect adjustment amount determination unit determines enlargement or reduction ratios of the left eye image and the right eye image and display positions thereof on the display unit, based on the depth information ZL and ZR.

(5) The image processing apparatus set forth in any one of (1) to (4), wherein the stereoscopic effect adjustment amount determination unit determines enlargement or reduction ratios of the left eye image and the right eye image and display positions thereof on the display unit, based on metadata attached to the input images.

(6) The image processing apparatus set forth in any one of (1) to (5), further including a display unit that performs 3D image display to which a left eye image and a right eye image which are the corrected images generated by the stereoscopic effect adjustment unit are applied.

A series of processes described in the specification may be performed by hardware, software, or a combination thereof. When a series of processes is performed by the software, the series of processes may be performed by installing programs recording a process sequence in a memory of a computer which is built in dedicated hardware, or, for example, by installing the programs in a general personal computer which can execute various kinds of processes. For example, the programs may be recorded on a recording medium in advance. The programs may not be also installed in a computer from the recording medium, but may be also received via a network such as a LAN (Local Area Network) or the Internet and may be installed in a recording medium such as a built-in hard disk.

Also, the various processes described in this specification may not be only performed in a time series according to the described order, but also performed in parallel or separately depending on a process capability of a device performing the processes or as necessary. In addition, the system in the present specification is a logical set of a plurality of constituent devices, and is not limited to the constituent devices being in the same casing.

The present disclosure contains subject matter related to that disclosed in Japanese Priority Patent Application JP 2011-085994 filed in the Japan Patent Office on Apr. 8, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a stereoscopic effect adjustment unit that receives left eye images and right eye images applied to three-dimensional image display, and performs stereoscopic effect adjustment by correcting the received images which are input images,
wherein the stereoscopic effect adjustment unit performs a reduction process or an enlargement process in a transverse direction for at least any ones of the left eye images and the right eye images, and generates corrected images where parallax is adjusted.

2. The image processing apparatus according to claim 1, wherein the stereoscopic effect adjustment unit determines display positions of the corrected images generated by reducing or enlarging at least any ones of the left eye images and the right eye images in the transverse direction, on a display unit.

3. The image processing apparatus according to claim 1, further comprising:
an input unit to which image setting information can be input; and
a stereoscopic effect adjustment amount determination unit that determines control parameters for determining image correction types according to the image setting information input from the input unit,
wherein the stereoscopic effect adjustment unit performs an image correction process and a display position determination process according to the control parameters determined by the stereoscopic effect adjustment amount determination unit.

4. The image processing apparatus according to claim 3, wherein the image setting information input from the input unit is left and right end portion depth information ZL and ZR of display images, wherein the stereoscopic effect adjustment amount determination unit determines enlargement or reduction ratios of the left eye image and the right eye image and display positions thereof on the display unit, based on the depth information ZL and ZR.

5. The image processing apparatus according to claim 3, wherein the stereoscopic effect adjustment amount determination unit determines enlargement or reduction ratios of the left eye image and the right eye image and display positions thereof on the display unit, based on metadata attached to the input images.

6. The image processing apparatus according to claim 1, further comprising a display unit that performs 3D image display to which a left eye image and a right eye image which are the corrected images generated by the stereoscopic effect adjustment unit are applied.

7. An image processing method executed in an image processing apparatus, comprising:

causing a stereoscopic effect adjustment unit to receive left eye images and right eye images applied to three-dimensional image display, and to perform stereoscopic effect adjustment by correcting the received images which are input images, wherein the adjusting of the stereoscopic effect includes performing a reduction process or an enlargement process in a transverse direction for at least any ones of the left eye images and the right eye images, and generating corrected images where parallax is adjusted.

8. A non-transitory computer-readable storage medium having stored thereon, a computer program having at least one code section, the at least one code section being executable by one or more processors for causing an image processing apparatus to perform steps comprising:

causing a stereoscopic effect adjustment unit to receive left eye images and right eye images applied to three-dimensional image display, and to perform stereoscopic effect adjustment by correcting the received images which are input images, wherein the adjusting of the stereoscopic effect includes performing a reduction process or an enlargement process in a transverse direction for at least any ones of the left eye images and the right eye images, and generating corrected images where parallax is adjusted.

* * * * *